(12) United States Patent  
Yang et al.

(10) Patent No.: US 12,296,923 B2  
(45) Date of Patent: May 13, 2025

(54) FLOATING POWER STATION AND BEARING DEVICE THEREFOR

(71) Applicant: SUNGROW FPV SCI. & TECH. CO., LTD., Anhui (CN)

(72) Inventors: Chenglin Yang, Anhui (CN); Tao Ma, Anhui (CN); Jiang Su, Anhui (CN); Hao Wu, Anhui (CN); Lihua Wang, Anhui (CN); Xiaorui Li, Anhui (CN)

(73) Assignee: SUNGROW FPV SCI. & TECH. CO., LTD. (CN)

( * ) Notice: Subject to any disclaimer, the term of this patent is extended or adjusted under 35 U.S.C. 154(b) by 551 days.

(21) Appl. No.: 17/642,419

(22) PCT Filed: Aug. 26, 2021

(86) PCT No.: PCT/CN2021/114699  
§ 371 (c)(1),  
(2) Date: Mar. 11, 2022

(87) PCT Pub. No.: WO2022/052813  
PCT Pub. Date: Mar. 17, 2022

(65) Prior Publication Data  
US 2022/0388606 A1   Dec. 8, 2022

(30) Foreign Application Priority Data  
Sep. 10, 2020   (CN) .......................... 202021975437.4

(51) Int. Cl.  
*B63B 1/12*        (2006.01)  
*B63B 35/44*       (2006.01)  
(Continued)

(52) U.S. Cl.  
CPC .............. *B63B 1/125* (2013.01); *B63B 35/44* (2013.01); *H02S 10/40* (2014.12); *H02S 20/00* (2013.01); *B63B 2035/4453* (2013.01)

(58) Field of Classification Search  
CPC ........... B63B 1/00; B63B 1/125; B63B 35/00; B63B 35/44; B63B 2035/4453; H02S 20/00  
(Continued)

(56) References Cited

U.S. PATENT DOCUMENTS 9,849,945 B2 * 12/2017 Gaveau .................. B63B 35/44  
11,239,789 B2 * 2/2022 Wang ...................... B63B 35/44  
(Continued)

FOREIGN PATENT DOCUMENTS

CN        105897127 A       8/2016  
CN        205754132 U      11/2016  
(Continued)

OTHER PUBLICATIONS

Search Report issued in counterpart European Application No. 2186589.8 on Jun. 17, 2024.

*Primary Examiner* — Lars A Olson  
(74) *Attorney, Agent, or Firm* — The Belles Group, P.C.

(57) ABSTRACT

A bearing device of a floating power station includes a supporting component and operation and maintenance passages formed by multiple operation and maintenance floating bodies arranged in sequence. Two adjacent rows of the operation and maintenance passages are connected by the supporting component, and an electrical device mounting position for mounting an electrical device is provided on the supporting component. In the bearing device for the floating power station provided according to the present application, the two adjacent rows of the operation and maintenance passages are connected by the supporting component, and the electrical device is mounted on the electrical device mounting position of the supporting component, that is, the mounting of the electrical device is not affected by a space between the two adjacent operation and maintenance pas- (Continued)

sages, thereby the versatility of the bearing device provided according to the present application is improved.

17 Claims, 13 Drawing Sheets

(51) Int. Cl.
*H02S 10/40* (2014.01)
*H02S 20/00* (2014.01)

(58) Field of Classification Search
USPC .......................................................... 114/266
See application file for complete search history.

(56) References Cited

U.S. PATENT DOCUMENTS

| | | | |
|---|---|---|---|
| 2014/0224165 A1 | 8/2014 | Veloso et al. | |
| 2020/0313601 A1 | 10/2020 | Wang et al. | |

FOREIGN PATENT DOCUMENTS

| | | | |
|---|---|---|---|
| CN | 207427027 U | 5/2018 | |
| CN | 207801805 U | 8/2018 | |
| CN | 109874406 A | 6/2019 | |
| CN | 109911135 A | 6/2019 | |
| FR | 3088233 A1 | 5/2020 | |

* cited by examiner

FLOATING POWER STATION AND BEARING DEVICE THEREFOR

The present application is a National Phase entry of PCT Application No. PCT/CN2021/114699, filed on Aug. 26, 2021, which claims the priority to Chinese Patent Application No. 202021975437.4, titled "FLOATING POWER STATION AND BEARING DEVICE THEREFOR", filed with the China National Intellectual Property Administration on Sep. 10, 2020, which are incorporated herein by reference in their entireties.

FIELD

The present application relates to the technical field of floating power stations, and in particular to a bearing device for a floating power station. The present application also relates to a floating power station including the bearing device.

BACKGROUND

A floating body of a bearing device in a floating power station is generally formed by hollow blow molding. In order to reduce the cost, an operation and maintenance passage is formed by connecting multiple operation and maintenance floating bodies in sequence. The operation and maintenance passage is used for bearing operation and maintenance personnel and their tools. An electrical device, such as a photovoltaic module is mounted between two adjacent rows of the operation and maintenance passages. Specifically; two ends of the photovoltaic module are respectively mounted on two adjacent rows of the operation and maintenance floating bodies, and the photovoltaic module is fixedly connected with the operation and maintenance floating bodies.

Since the electrical device is directly connected with the operation and maintenance floating bodies, the arrangement of the operation and maintenance floating bodies needs to be adjusted according to the structural size of the electrical device, and the space between any two adjacent rows of the operation and maintenance passages is equal, so that electrical devices of the same structural size needs to be mounted, which results in low versatility of the bearing device.

Therefore, how to improve the versatility of a bearing device is a technical problem to be solved urgently by those skilled in the art.

SUMMARY

A bearing device for a floating power station is provided by the present application, which has improved versatility. A floating power station including the bearing device is further provided by the present application.

A bearing device for a floating power station provided according to the present application includes a supporting component and operation and at least two rows of maintenance passages formed by multiple operation and maintenance floating bodies arranged in sequence, two adjacent rows of the operation and maintenance passages are connected by the supporting component, and an electrical device mounting position for mounting an electrical device is provided on the supporting component.

Preferably, each operation and maintenance floating body includes a main floating body for forming a floating chamber and two ear connectors mounted on short edges, located at two sides, of the main floating body, the ear connectors are provided with floating body mounting positions for connecting the two adjacent operation and maintenance floating bodies in the same row.

Preferably, the supporting component is a supporting rod.

Preferably, two ends of the supporting rod are respectively connected to opposite sides of the operation and maintenance floating bodies in two rows of the operation and maintenance passages.

Preferably, a mounting groove for supporting and accommodating the supporting rod is provided on an upper surface of the main floating body, and two ends of the mounting groove extend to two ends of the main floating body in a longitudinal direction.

Preferably, at least two mounting grooves are provided, and all the mounting grooves are arranged in a sequence in a transverse direction of the main floating body.

Preferably; an end of the mounting groove of the main floating body is provided with a ear holder, and the ear holder is provided with a mounting hole for connection with the supporting rod.

Preferably, the multiple operation and maintenance floating bodies in the same row include at least two first operation and maintenance floating bodies and a second operation and maintenance floating body, the second operation and maintenance floating body is connected between two adjacent first operation and maintenance floating bodies, and supporting rod mounting positions for mounting the supporting rod are provided on the ear connectors of the first operation and maintenance floating bodies.

Preferably; each main floating body of the multiple operation and maintenance floating bodies in the same row include an upper side wall and a lower side wall, the lower side wall protrudes out of two sides of the upper side walls along an arrangement direction of the operation and maintenance floating bodies in the same row, an end of the upper side wall is connected to an end of the ear connector, the lower side wall is connected to a lower surface of the ear connector, and the supporting rod mounting positions are located directly above the lower side walls.

Preferably, a first leg and a second leg for supporting front and rear sides of the electrical device are provided on the supporting rod, and a height of the first leg is larger than a height of the second leg.

Preferably, a V-shaped supporting frame for supporting the electrical device is included.

Preferably; the V-shaped supporting frame is mounted on the supporting rod.

Preferably, a middle supporting rod for mounting the electrical device is provided between two adjacent rows of operation and maintenance floating bodies, and the middle supporting rod is connected to two middle supporting rods.

Preferably, the ear connector includes a first ear connector and a second ear connector respectively located on the short sides of the two sides of the main floating body, a height of a lower surface of the first ear connector is the same as a height of an upper surface of the second ear connector when the main floating body naturally floats on the water surface, a bottom of the second ear connector is provided with a supporting plate, the first ear connector of one of the two adjacent the operation and maintenance floating bodies is connected to the second ear connector of the other of the two adjacent the operation and maintenance floating bodies in the same raw; and the supporting component is mounted on the first ear connector.

Preferably, the operation and maintenance floating body includes a main floating body, and two long edges of a top end of the main floating body are each provided with a groove for supporting the supporting component.

Preferably, the supporting component includes a longitudinal connecting rod and a transverse connecting rod connected to the longitudinal connecting rod, the longitudinal connecting rod is connected to the grooves of two adjacent operation and maintenance floating bodies in the operation and maintenance passage, and the electrical device mounting position is provided on the transverse connecting rod.

Preferably, a filling medium of the internal chamber of s a density smaller than water and/or a solid with a density smaller than water.

A floating power station, includes the bearing device according to any one of the above and a photovoltaic module mounted on the electrical device mounting position.

Preferably, between two adjacent operation and maintenance passages, at least two rows of the photovoltaic modules are arranged in an arrangement direction of the operation and maintenance floating bodies in the operation and maintenance passages.

Preferably, upper surfaces of all the photovoltaic modules in the same row are coplanar; or upper surfaces of all the photovoltaic modules in the same row are parallel, and the upper surfaces of the two adjacent photovoltaic modules in the same row are arranged in parallel and equally spaced apart.

In the above technical solution, the bearing device for the floating power station provided according to the present application, includes the supporting component and operation and maintenance passages formed by multiple operation and maintenance floating bodies arranged in sequence, two adjacent rows of the operation and maintenance passages are connected by the supporting component, and the electrical device mounting position for mounting the electrical device is provided on the supporting component. When the floating power station requires to be assembled, first the operation and maintenance floating bodies in the same row are arranged in sequence, and the operation and maintenance passage is formed, then the supporting component is mounted in the two adjacent rows of the operation and maintenance passages, and then the electrical device is mounted on the electrical device mounting position of the supporting rod.

As can be seen from the above description, in the bearing device for the floating power station provided according to the present application, the two adjacent rows of the operation and maintenance passages are connected by the supporting component, and the electrical device is mounted on the electrical device mounting position of the supporting component, that is, the mounting of the electrical device is not affected by a space between the two adjacent operation and maintenance passages, thereby the versatility of the bearing device provided according to the present application is improved.

BRIEF DESCRIPTION OF THE DRAWINGS

For more clearly illustrating embodiments of the present application or the technical solutions in the conventional technology, drawings to be used in the description of the embodiments or the conventional technology will be briefly described hereinafter. Apparently, the drawings in the following description are only some embodiments of the present application. For those skilled in the art, other drawings may be obtained based on the provided drawings without any creative work.

Figure 1:
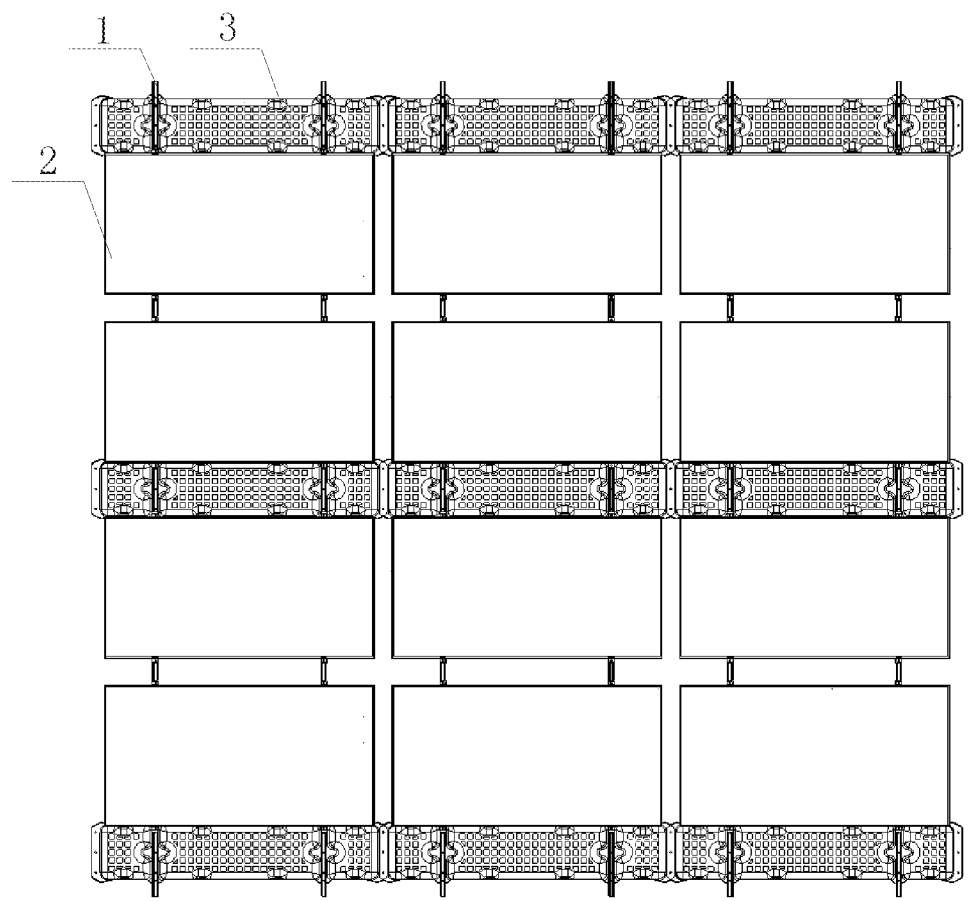
FIG. 1 is a schematic structural diagram of a floating power station provided according to a first embodiment of the present application.
Figure 2:
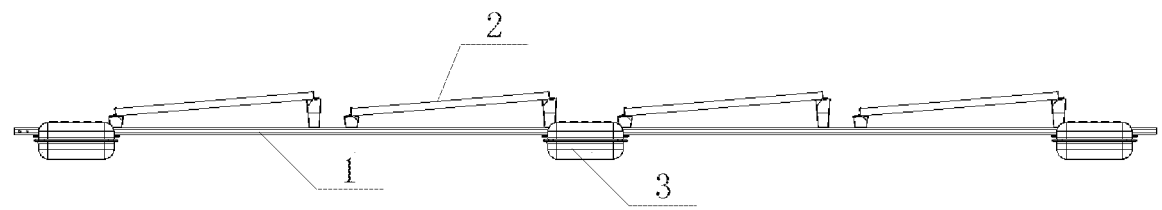
FIG. 2 is a side view of the floating power station shown in FIG. 1.
Figure 3:
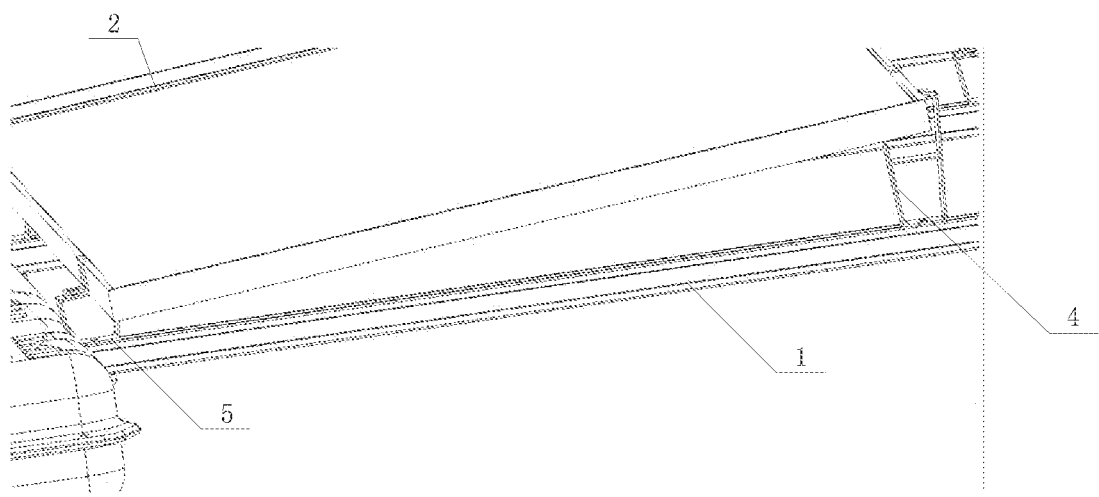
FIG. 3 is an enlarged view of the mounting position of a photovoltaic module provided according to the embodiment of the present application.
Figure 4:
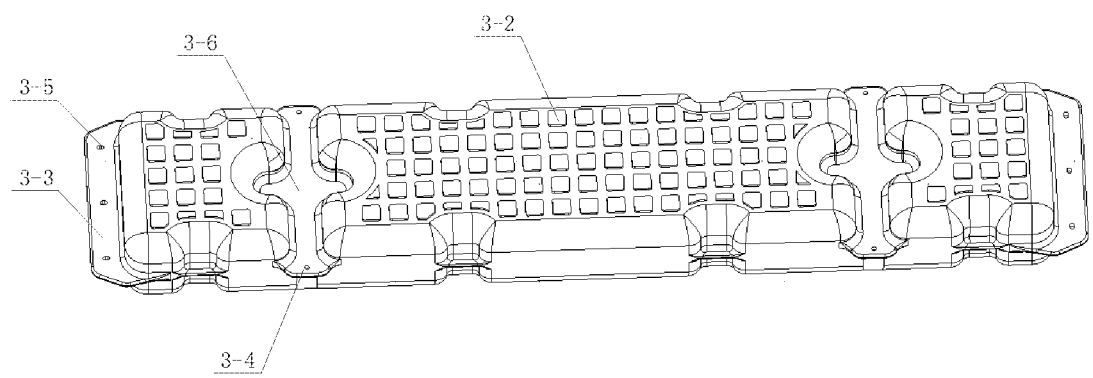
FIG. 4 is a schematic structural diagram of an operation and maintenance floating body of the floating power station shown in FIG. 1.
Figure 5:
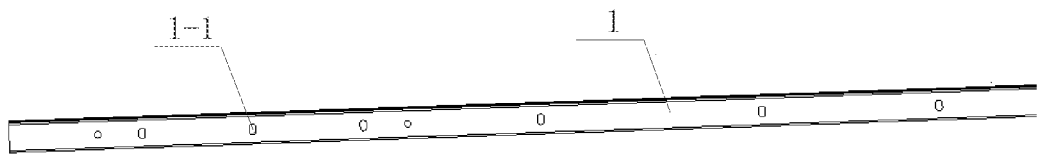
FIG. 5 is a schematic structural diagram of a supporting rod provided according to the embodiment of the present application.

The reference numerals in FIGS. 1 to 28 are:

| | |
|---|---|
| 1 supporting rod; | 1-1 electrical device mounting position; |
| 2 photovoltaic module; | 3 operation and maintenance floating body; |
| 3A second operation and maintenance floating body; | |
| 3B first operation and maintenance floating body; | |
| 3-1 main floating body; | 3-1-1 upper side wall; |
| 3-1-2 lower side wall; | 3-2 anti-slip protrusion; |
| 3-3 ear connector; | 3-3-1 supporting platform; |
| 3-3-2 first ear connector; | 3-3-3 second ear connector; |
| 3-4 supporting rod mounting position; | 3-5 floating body mounting position; |
| 3-6 mounting groove; | 3-7 groove body; |
| 3-7 ear holder; | 5-8 supporting plate; |
| 4 first leg; | 5 second leg; |
| 6 supporting base; | 7 longitudinal connecting rod; |
| 8 transverse connecting rod; | 9 middle supporting rod; |
| 10 pressing block; | 11 V-shaped supporting frame; |
| 12 floating body supporting member; | 13 first U-shaped bolt; |
| 14 second U-shaped bolt. | |

DETAILED DESCRIPTION OF THE EMBODIMENTS

A bearing device for a floating power station, which has the improved versatility of the bearing device. A floating power station including the bearing device is further provided by the present application.

In order to enable those skilled in the art to better understand the technical solutions of the present application, the present application will be further described in detail below with reference to the drawings and embodiments.

Reference is made to FIGS. 1 to 16.

In a specific embodiment, a bearing device for a floating power station provided includes a supporting component and at least two operation and maintenance passages formed by multiple operation and maintenance floating bodies 3 arranged in sequence, two adjacent rows of the operation and maintenance passages are connected by the supporting component, and an electrical device mounting position 1-1 for mounting an electrical device is provided on the supporting component. Each operation and maintenance floating body 3 is composed of a closed housing filled with a gas with density smaller than water and/or a solid with density smaller than water. One row of the operation and maintenance floating bodies 3 or at least two rows of the operation and maintenance floating bodies 3 may be arranged in a single operation and maintenance passage according to actual needs, which is not specifically limited in this application.

Specifically, the operation and maintenance floating bodies 3 in the operation and maintenance passage may be arranged in a north-south direction or an east-west direction, which depends on the orientation of a photovoltaic module. The two adjacent operation and maintenance floating bodies 3 in the operation and maintenance passage may be arranged spaced apart, which may improve the flexibility of arranging the operation and maintenance floating bodies 3. In order to improve connection stability, preferably, the two adjacent operation and maintenance floating bodies 3 in the operation and maintenance passage are fixedly connected.

In order to improve the working safety of the staff, preferably, the walking surface of on each operation and maintenance floating body 3 for the staff is provided with multiple anti-slip protrusions 3-2.

The electrical device mounted on the supporting component may be one type of electrical device, or multiple types of electrical devices, and the type and quantity of specific electrical devices are determined according to actual needs.

Specifically, the supporting component is detachably mounted on the operation and maintenance floating body 3, and the operation and maintenance floating body 3 has two supporting rod mounting positions 3-4 through a single supporting component.

When the floating power station requires to be assembled, first, the operation and maintenance floating bodies 3 in the same row are connected, and the operation and maintenance passage is formed, then the supporting component is mounted on the operation and maintenance floating body 3, and then the electrical device is mounted on the electrical device mounting position 1-1 of the supporting component.

It can be seen from the above description that, in the bearing device for the floating power station provided according to specific embodiment of the present application, the two adjacent rows of the operation and maintenance passages are connected by the supporting component, and the electrical device is mounted on the electrical device mounting position 1-1 of the supporting component, that is, the component is not directly connected to the floating body, thus a number proportion of floating bodies to component may be adjusted flexibly according to project requirements, and the mounting of the electrical device is not affected by a distance between two adjacent operation and maintenance passages, thereby the versatility of the bearing device provided according to the present application is improved.

In a specific embodiment, the operation and maintenance floating body 3 includes a main floating body 3-1 for forming a floating chamber and two ear connectors 3-3 mounted on short edges, located at two sides, of the main floating body 3-1, each ear connector 3-3 is provided with multiple floating body mounting positions 3-5 for connecting the two adjacent operation and maintenance floating bodies 3 in the same row. The operation and maintenance floating bodies 3 in a same raw are connected in series for providing an operation and maintenance function for the entire floating solution. Specifically, the ear connectors 3-3 are mounted on the short edges, located at two sides, of the operation and maintenance floating body 3, the ear connectors 3-3 mounted on the short sides of the operation and maintenance floating body 3 form short-edge ear connectors, and each of the ear connectors 3-3 includes multiple floating body mounting positions 3-5 for connecting the floating bodies.

In an embodiment, the supporting component is a supporting rod 1.

Specifically, two ends of the supporting rod 1 are respectively connected to opposite sides of the operation and maintenance floating bodies 3 in two rows of the operation and maintenance passages. Specifically, the supporting rod 1 is detachably connected with the operation and maintenance floating bodies 3.

As shown in FIGS. 1 to 4, specifically, a mounting groove 3-6 for supporting and accommodating the supporting rod 1 is provided on an upper surface of the main floating body 3-1, and two ends of the mounting groove 3-6 extend to two ends of the main floating body 3-1 in a longitudinal direction. Specifically, the two ends of the mounting groove 3-6 form long-side ear connectors, as rod mounting positions 3-4, for mounting the supporting rod 1. Since the two ends of the mounting groove 3-6 extend to the two ends of the main floating body 3-1 in the longitudinal direction, the supporting rod 1 is able to pass through the main floating body 3-1 at a middle position and connect to the two adjacent rows of the main floating bodies 3-1 thereof, so that one supporting rod connects no less than three floating bodies.

Figure 18:
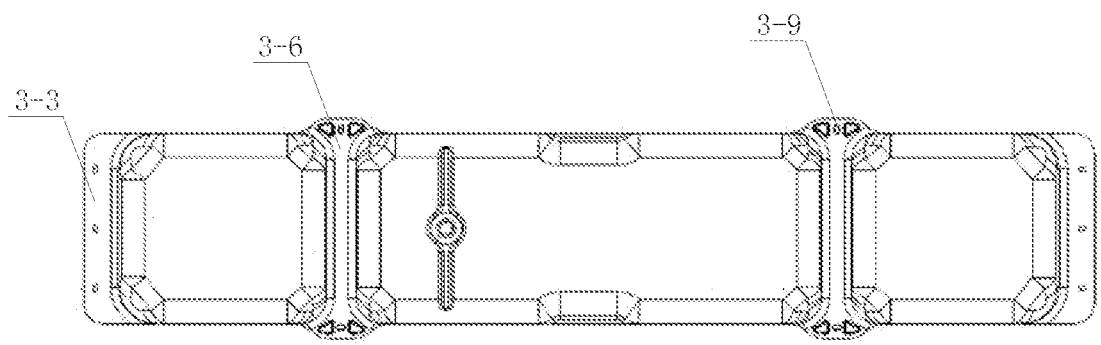
FIG. 18 is a top view of the operation and maintenance floating body in FIG. 17.
Figure 19:
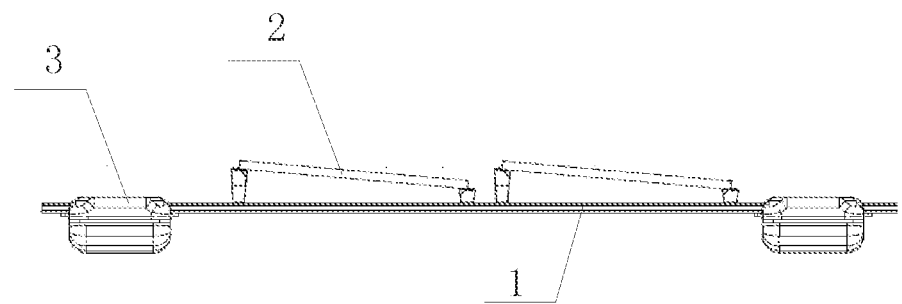
FIG. 19 is a schematic structural diagram of a floating power station formed by assembly of the operation and maintenance floating body shown in FIG. 17.
Figure 20:
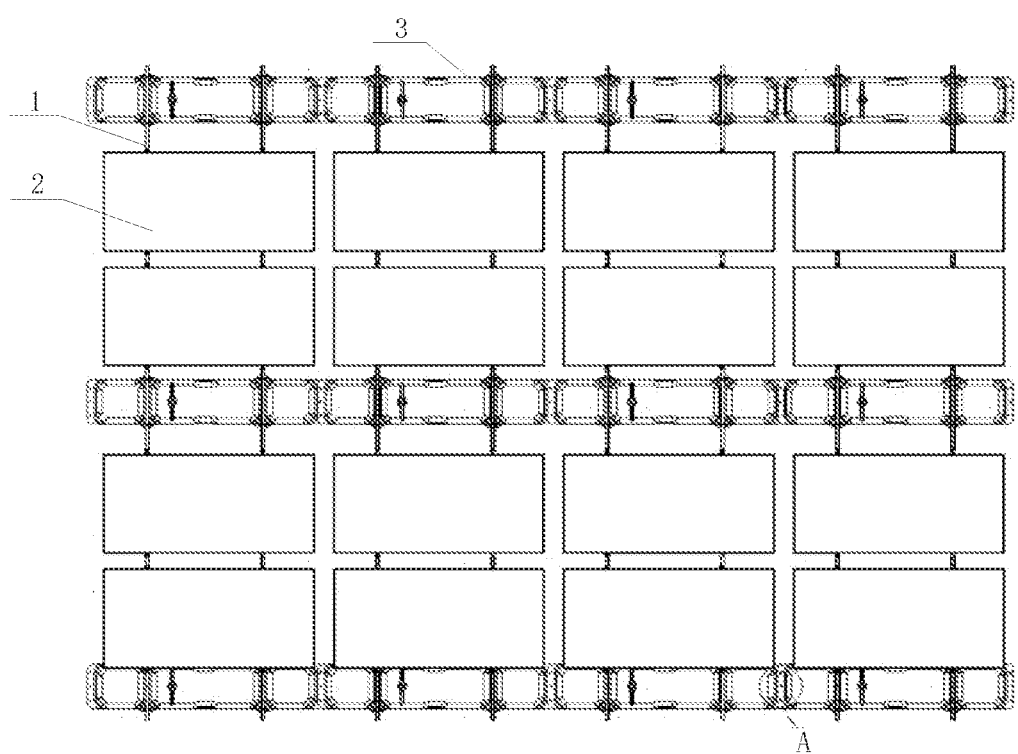
FIG. 20 is a top view of the floating power station formed by assembly of the operation and maintenance floating body shown in FIG. 17.
Figure 21:
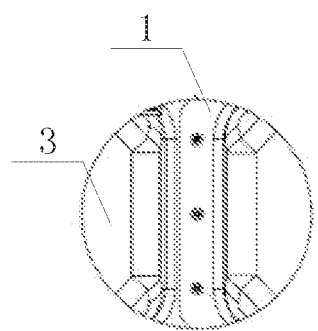
FIG. 21 is an enlarge view of A part of the floating power station shown in FIG. 20.
Figure 22:
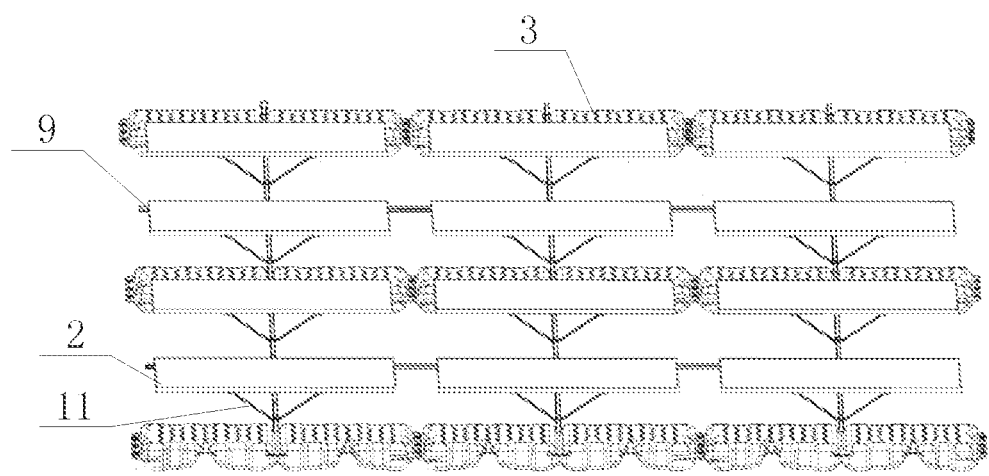
FIG. 22 is a schematic structural diagram of a third floating power station provided according to the embodiment of the present application.
Figure 23:
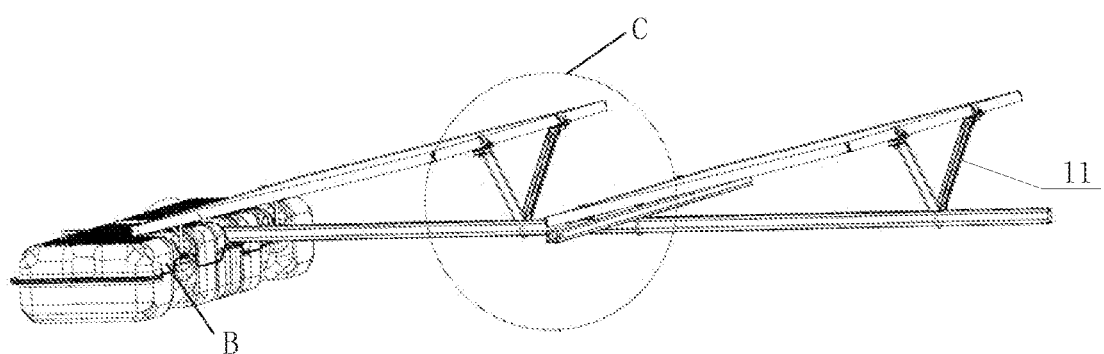
FIG. 23 is a side view of the floating power station shown in FIG. 22.
Figure 24:
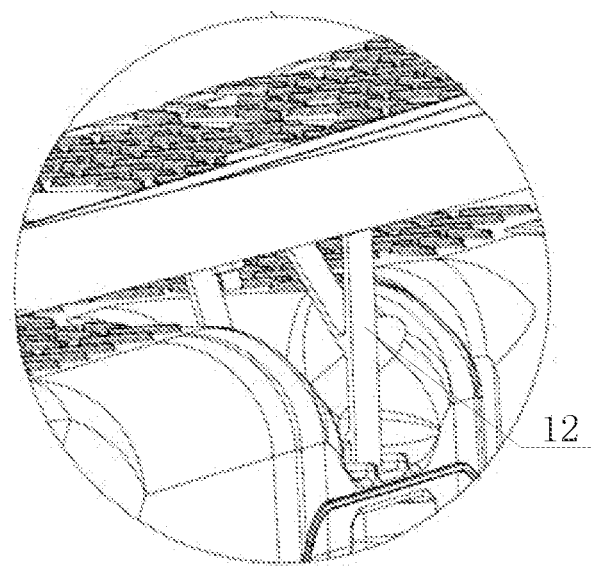
FIG. 24 is an enlarge view of B part of the floating power station shown in FIG. 23.
Figure 25:
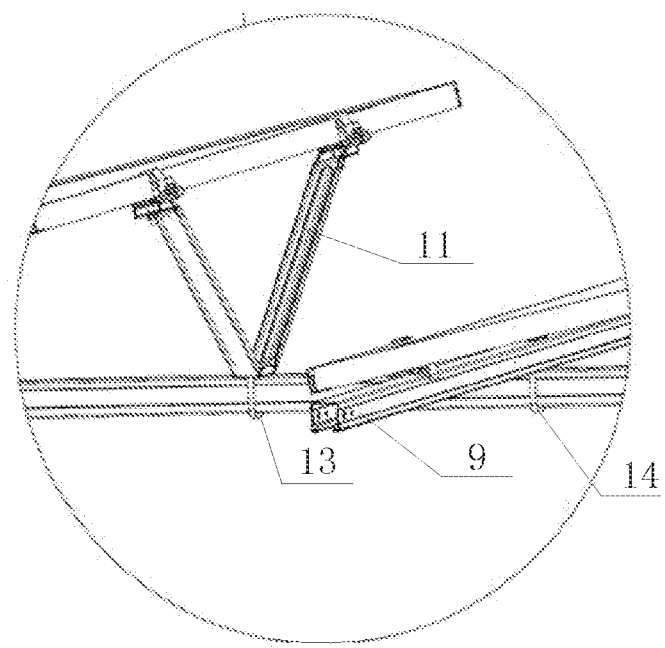
FIG. 25 is an enlarge view of C part of the floating power station shown in FIG. 23.
Figure 26:
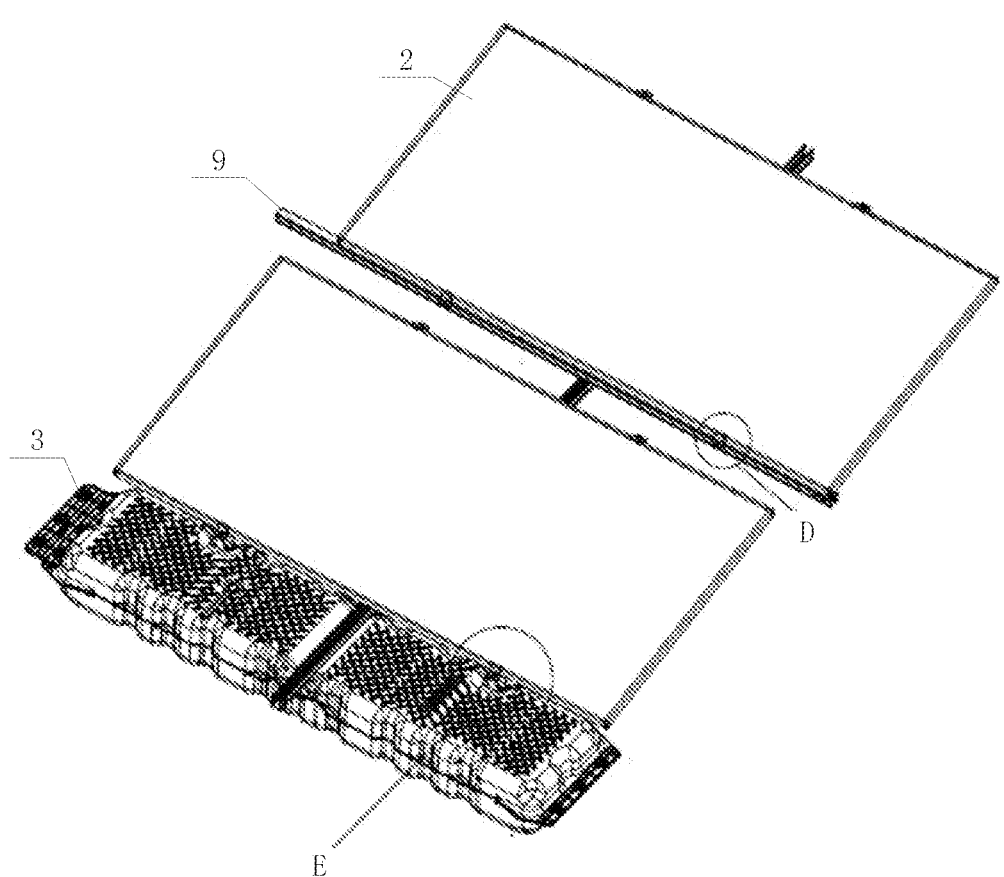
FIG. 26 is a partial enlarge view of the floating power station shown in FIG. 22.
Figure 27:
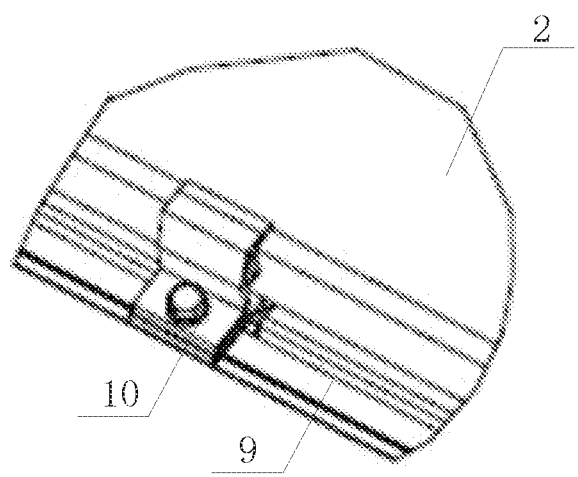
FIG. 27 is an enlarge view of D part of the floating power station shown in FIG. 26.
Figure 28:
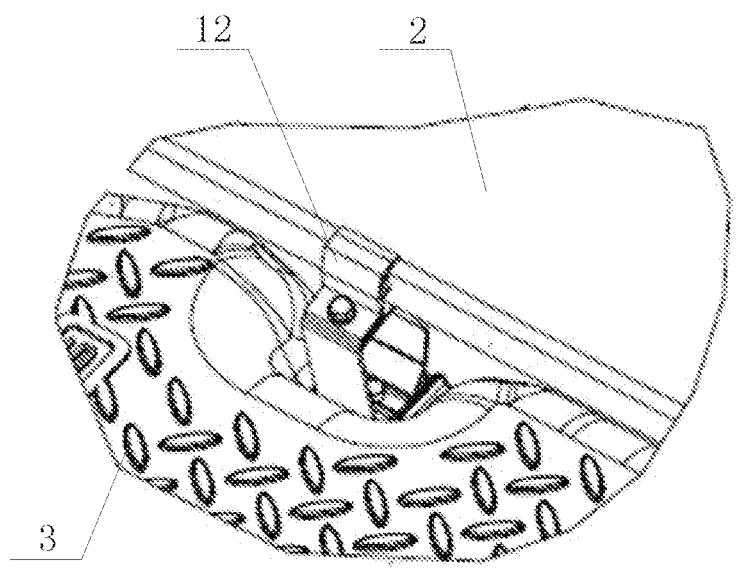
FIG. 28 is an enlarge view of E part of the floating power station shown in FIG. 26.

For facilitating connection of the operation and maintenance floating body 3 and the supporting rod 1, as shown in FIG. 18, preferably, an end of the mounting groove 3-6 of the main floating body 3-1 is provided with an ear holder 3-9 so as to forming the supporting rod mounting positions 3-4, and the ear holder 3-9 is provided with a mounting hole for connection with the supporting rod 1. Specifically, a threaded fastener is provided in the mounting hole for connection with the supporting rod 1.

In a specific embodiment, at least two mounting grooves 3-6 are provided, and all the mounting grooves 3-6 are arranged in sequence in a direction of the main floating bodies 3-1 in the same row. The supporting rod 1 is provided with multiple mounting holes for mounting on the supporting rod mounting positions 3-4, and the mounting holes correspond to the mounting positions on long-edge ear connectors of the long sides of the main floating body, and the mounting holes are configured to connect the supporting rod 1 with the operation and maintenance floating bodies 3 together.

The operation and maintenance floating bodies 3 are transversely connected and used as operation and maintenance passages, and the supporting rod is arranged vertically relative to the floating body. Preferably, each of the operation and maintenance floating bodies 3 is correspondingly connected with two supporting rods 1, so that a large floating square array is formed by longitudinal and transverse arrangement. Each of the electrical devices straddles two supporting rods 1 correspondingly mounted on one operation and maintenance floating body 3, and the number of the electrical devices mounted between the two adjacent rows of the operation and maintenance floating passages may be adjusted arbitrarily.

A first leg 4 and a second leg 5 for supporting front and rear sides of the electrical device are provided on the supporting rod 1, and a height of the first leg 4 is larger than a height of the second leg 5, and the electrical device is preferably a photovoltaic module 2. An inclined angle is formed after the photovoltaic module 2 is mounted. Each of the photovoltaic modules 2 straddles the two supporting rods 1 corresponding to one operation and maintenance floating body 3, and such many photovoltaic modules 2, first legs 4, second legs 5, supporting rods and the operation and maintenance floating bodies 3 form the main components of the floating power station.

When the electrical devices are specifically mounted, one row, two rows or at least three rows of the electric devices may be mounted between two adjacent rows of the operation and maintenance passages.

In a specific embodiment, the bearing device for the floating power station further includes a V-shaped supporting frame 11 for supporting the electric device. Specifically, the V-shaped supporting frame 11 may be mounted on the supporting rod 1 or the operation and maintenance floating body 3. Specifically, the V-shaped supporting frame 11 may be fixed by a first U-shaped blot 13. The V-shaped supporting frame 11 has two connecting points with the electric device, which improves the supporting reliability of the electric device.

Specifically, if the electric device is inclined, the V-shaped supporting frame 11 may be supported on a top end or a bottom end of the electric device.

One end of the electric device is mounted on the operation and maintenance floating body 3 through a floating body supporting member 12. In order to improve the connecting reliability, the electric device preferably has at least two floating body supporting members 12.

In order to arrange several rows of electric devices inbetween two adjacent operation and maintenance floating bodies 3, preferably, the bearing device for the floating power station further includes a middle supporting rod 9 for mounting the electrical device, and the middle supporting rod 9 is provided between two adjacent rows of operation and maintenance floating bodies 3, and the supporting rod 9 is connected to two middle supporting rods 1, Specifically, one row of the electric device in several rows of electric devices may be mounted on the middle supporting rod 9. Certainly, the V-shaped supporting frame 11 may also be mounted on the middle supporting rod 9, and the electric device may be mounted on the middle supporting rod 9 through the V-shaped supporting frame 11.

In order to improve the connecting reliability, preferably, the middle supporting rod 9 may be mounted on the middle supporting rod 1 through a second U-shaped blot 14. Specifically, the middle supporting rod 9 may be lapped on and connected to the middle supporting rod 1.

The end of the electric device may be mounted on the middle supporting rod 9 through a pressing block 10.

Figure 6:
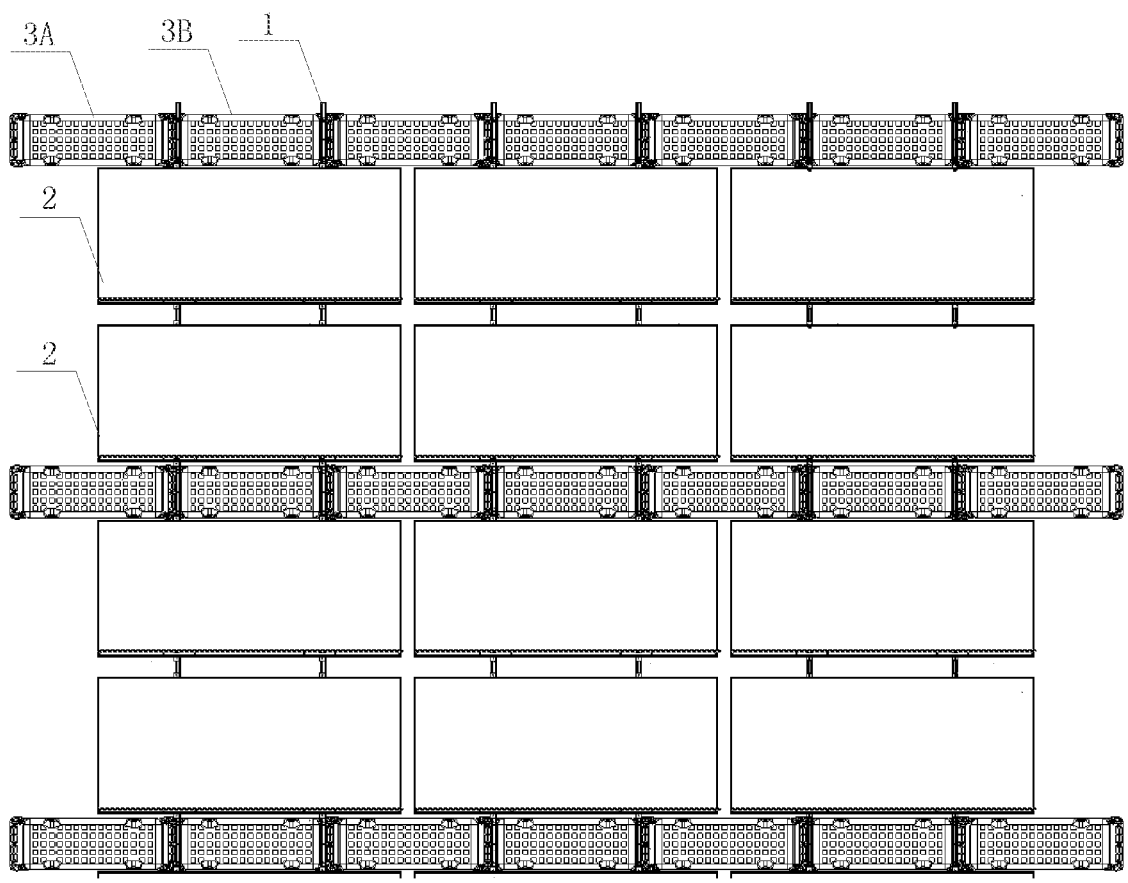
FIG. 6 is a schematic structural diagram of a second floating power station provided according to the embodiment of the present application.

In another specific embodiment, the multiple operation and maintenance floating bodies 3 in the same row include first operation and maintenance floating bodies 3B and second operation and maintenance floating bodies 3A, and the second operation and maintenance floating body 3A is connected between two adjacent first operation and maintenance floating bodies 3B. As shown in FIG. 6, one second operation and maintenance floating body 3A may be connected between two adjacent first operation and maintenance floating bodies 33.

Specifically, when multiple second operation and maintenance floating bodies 3A are provided between the two adjacent first operation and maintenance floating bodies 3B, the second operation and maintenance floating bodies 3A are transversely connected in sequence, and the two second operation and maintenance floating bodies 3A at two ends are respectively connected to the two adjacent first operation and maintenance floating bodies 3B. The ear connectors 3-3 of the first operation and maintenance floating bodies 38 are provided with supporting rod mounting positions 3-4 for mounting the supporting rod 1 that is, the supporting rod 1 is mounted on the first operation and maintenance floating bodies 3B.

Figure 7:
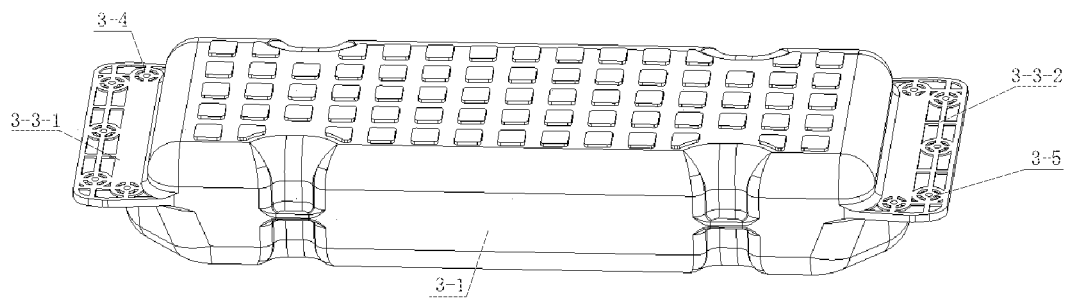
FIG. 7 is a schematic structural diagram of a first operation and maintenance floating body of the floating power station shown in FIG. 6.
Figure 8:
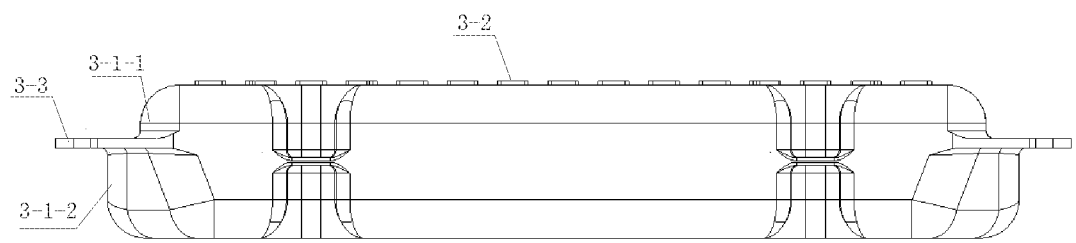
FIG. 8 is a side view of the first operation and maintenance floating body shown in FIG. 7.

As shown in FIGS. 6 to 8, the main floating body 3-1 of the first operation and maintenance floating body 3B includes an upper side wall 3-1-1 and a lower side wall 3-1-2, the lower side wall 3-1-2 protrudes out of two sides of the upper side wall 3-1-1 along an arrangement direction of the operation and maintenance floating bodies 3 in the same row, an end of the upper side wall 3-1-1 is connected to an end of the ear connector 3-3, the lower side wall 3-1-2 is connected to a lower surface of the ear connector 3-3, and the supporting rod mounting positions 3-4 are located directly above the lower side wall 3-1-2. Specifically, a platform for mounting the supporting rod 1 on the ear connector 3-3 forms a supporting platform 3-3-1, and the supporting platform 3-3-1 is located in a downward projection of the lower side wall 3-1-2.

In this embodiment, the supporting rod 1 is only mounted on the second operation and maintenance floating bodies 3A, and the first operation and maintenance floating bodies 3B are connected with the second operation and maintenance floating body 3A.

The main floating body 3-1 of each of the multiple operation and maintenance floating bodies 3 in the same row includes an upper side walls 3-1-1 and a lower side walls 3-1-2, the lower side wall 3-1-2 protrudes out of two sides of the upper side wall 3-1-1 along an arrangement direction of the operation and maintenance floating bodies 3 in the same row, an end of the upper side wall 3-1-1 is connected to an end of the ear connector 3-3, the lower side wall 3-1-2 is connected to a lower surface of the ear connector 3-3, and the supporting rod mounting positions 3-4 are located directly above the lower side wall 3-1-2. That is, in this embodiment, the operation and maintenance floating bodies 3 are the form of the above second operation and maintenance floating body 3A, During specific assembly, the supporting rod 1 may be provided on each of the operation and maintenance floating bodies 3 or spaced apart as needed, so that the versatility of the bearing device is further improved.

In order to improve the connection stability and facilitate maintenance, preferably, the supporting rod 1 is detachably connected to one operation and maintenance floating body 3 through at least two electrical device mounting positions 1-1. Specifically, the supporting rod 1 is connected to the operation and maintenance floating body 3 by threaded fasteners or buckles.

The bearing device provided according to the present application has a simple structure, and few components, and the proportion of electrical devices to the operation and maintenance floating bodies 3 may be flexibly adjusted, which is convenient for wide use. In this application, the proportion of the photovoltaic modules 2 between the two adjacent rows of the operation and maintenance floating bodies 3 may be flexibly set, that is, it may be adjusted according to different requirements for buoyancy of different projects, which may reduce costs accordingly.

In a specific embodiment, in the bearing device provided according to the present application, it is composed of multiple longitudinally connected operation and maintenance floating bodies 3 and transversely connected supporting rods, each of the operation and maintenance floating bodies 3 is connected with two supporting rods, and each of the supporting rods is connected with no less than two operation and maintenance floating bodies 3 at the same time.

Figure 9:
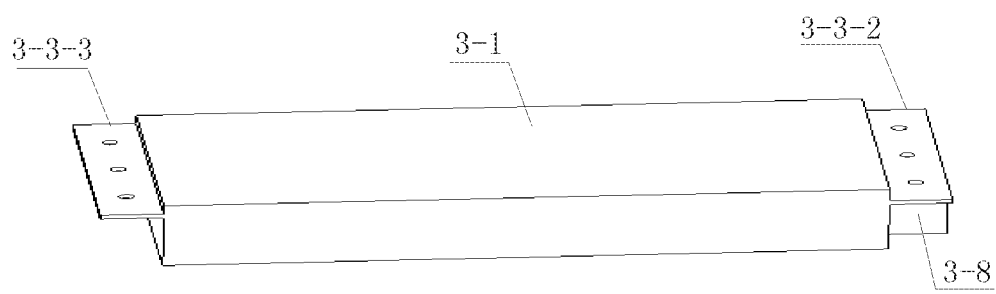
FIG. 9 is a schematic structural diagram of a first operation and maintenance floating body provided according to the embodiment of the present application.

As shown in FIG. 9, the ear connector 3-3 includes a first ear connector 3-3-2 and a second ear connector 3-3-3 respectively mounted on the short edges, located at two sides, of the main floating body 3-1, a height of a lower surface of the first ear connector 3-3-2 is the same as a height of an upper surface of the second ear connector 3-3-3 when the main floating body 3-1 naturally floats on the water surface, a bottom of the second ear connector 3-3-3 is provided with a supporting plate 3-8, the first ear connector 3-3-2 of one of the two adjacent the operation and maintenance floating bodies 3 is connected to the second ear connector 3-3-3 of the other one of the two adjacent the operation and maintenance floating bodies 3 in the same raw. Preferably, the first ear connector 3-3-2, the second ear connector 3-3-3 and the supporting plate 3-8 are integrally formed with the main floating body 3-1.

Figure 10:
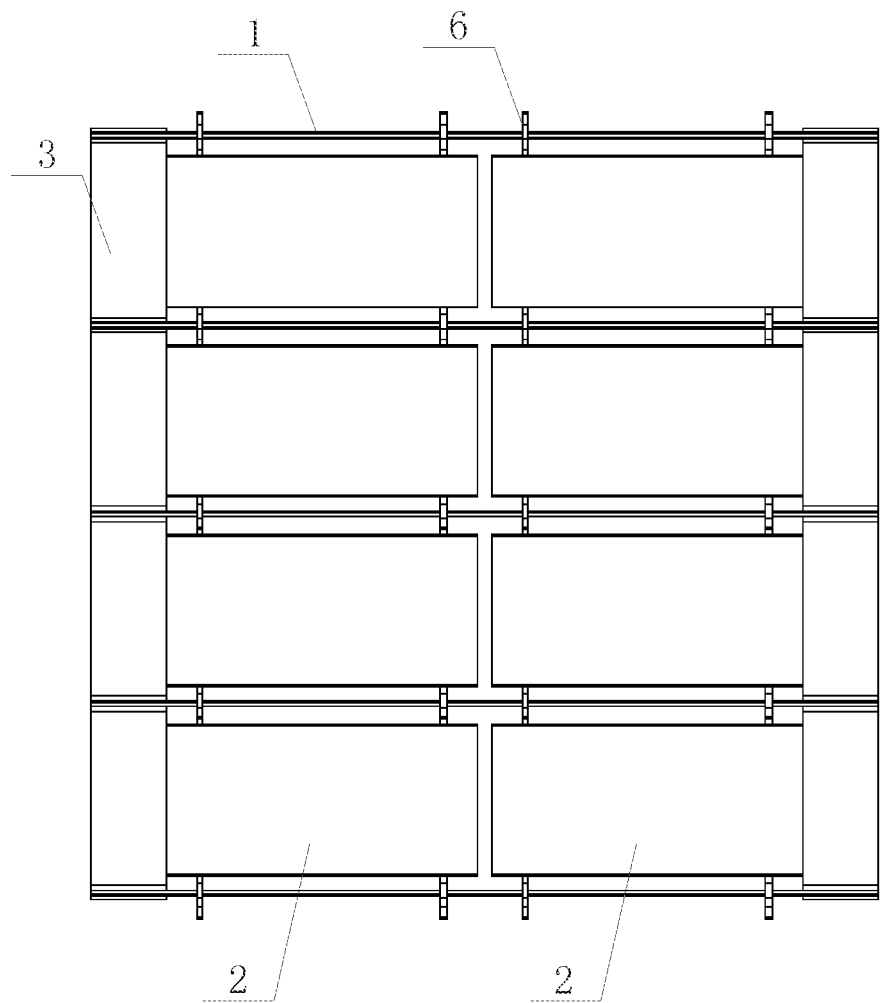
FIG. 10 is a schematic structural diagram of a floating power station formed by assembly of the operation and maintenance floating body shown in Fla 9.
Figure 11:
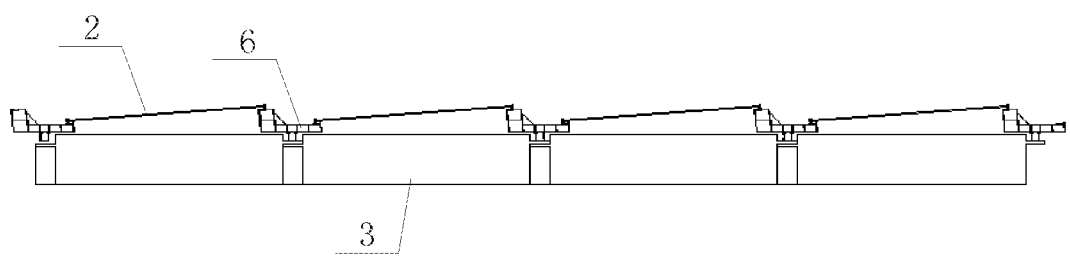
FIG. 11 is a side view of the floating power station shown in FIG. 10.

As shown in FIG. 10, a bracket of the photovoltaic module 2 is mounted on the supporting rod 1 through a supporting base 6. Front and rear ends of the supporting rod 1 on the supporting base are respectively used to connect with front and rear photovoltaic modules 2 and the force type of the supporting base 6 is the same as the force type of a shoulder pole carrying a product. The supporting base 6 is provided with a first supporting member for supporting a bottom end of one photovoltaic module 2 and a second supporting member for supporting a top end of the other one photovoltaic module 2, and a height of the top end of the second supporting member is larger than a height of a top end of the first supporting member.

Specifically, the first ear connector 3-3-2 and the second ear connector 3-3-3 are located on the short edges of the operation and maintenance floating body 3, Multiple mounting positions are provided on the first ear connector 3-3-2 and the second ear connector 3-3-3 for connecting the operation and maintenance floating bodies 3, or may also be used for connecting the supporting component and the operation and maintenance floating body 3.

The supporting rods 1 are arranged vertically relative to the long edges of the operation and maintenance floating body 3, and each of the operation and maintenance floating bodies 3 may be connected to two supporting rods 1, so that a large floating square array is formed by longitudinal and transverse arrangement.

Specifically, multiple supporting bases 6 are arranged on the supporting rod 1, and front and rear components are mounted on one supporting base 6. The front and rear heights of the supporting base 6 are different, so that the photovoltaic module forms an inclined angle. Each of the photovoltaic modules straddles the two supporting rods 1 corresponding to one operation and maintenance floating body 3, and such many photovoltaic modules, supporting bases 6, supporting rods 1 and operation and maintenance floating bodies 3 constitute a complete floating power station. The proportional relationship between the operation and maintenance floating body 3 and the photovoltaic module may be adjusted arbitrarily, and may not be the proportional relationship of 1:2 as shown in the figure. The operation and maintenance floating body 3 may be arranged in a gap between the photovoltaic modules 2 or under the photovoltaic module 2.

Figure 13:
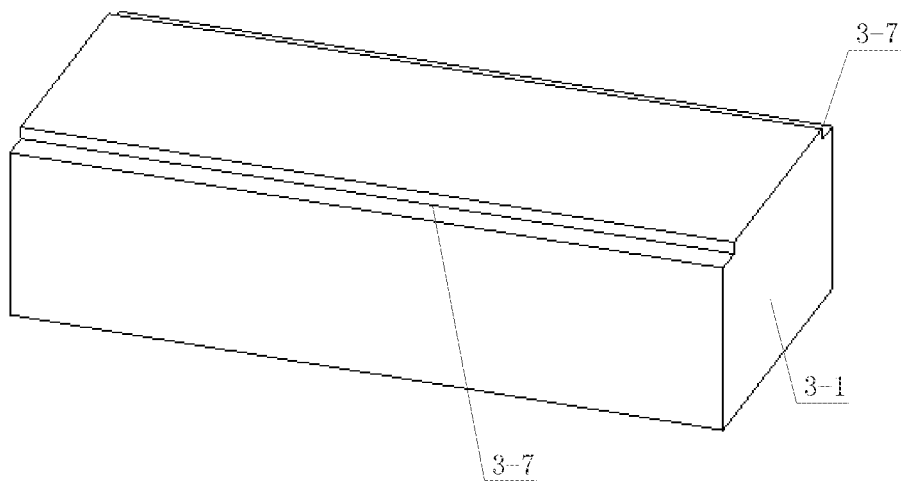
FIG. 13 is a schematic structural diagram of a second operation and maintenance floating body provided according to the embodiment of the present application.
Figure 14:
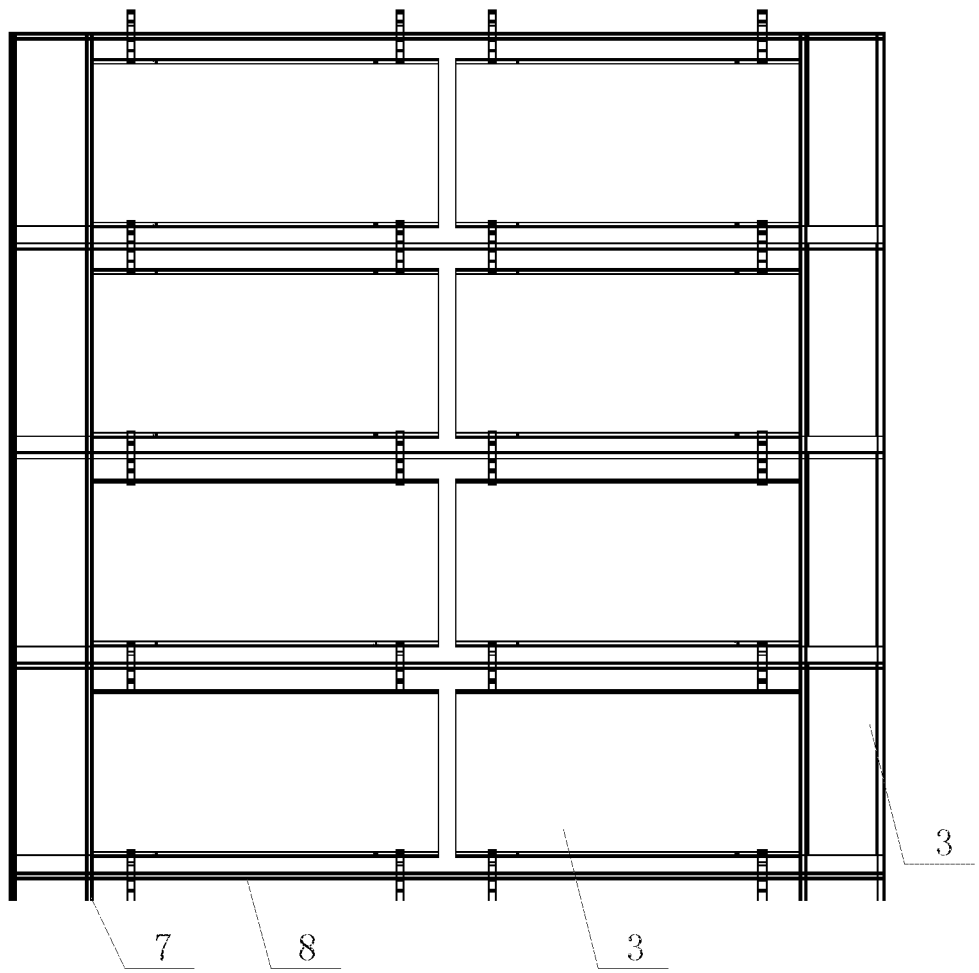
FIG. 14 is a schematic structural diagram of a floating power station formed by assembly of the operation and maintenance floating body shown in FIG. 13.
Figure 15:
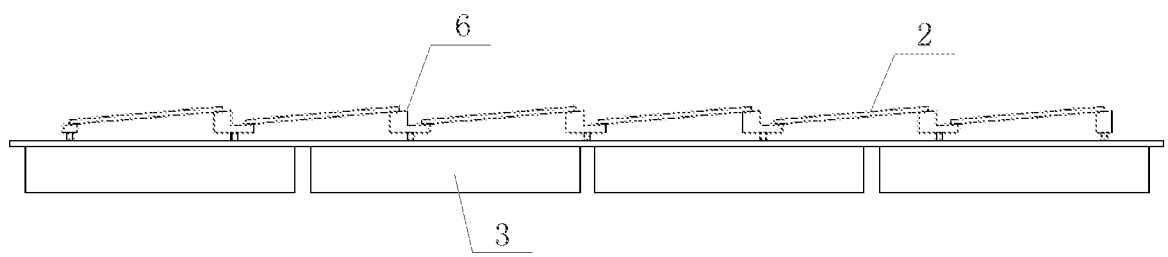
FIG. 15 is a side view of the floating power station shown in FIG. 14.

As shown in FIG. 13, the operation and maintenance floating body 3 includes a main floating body 3-1, and two long edges of a top end of the main floating body 3-1 are provided with a groove body 3-7 for supporting the supporting component. Preferably, the groove body 3-7 extends to opposite ends of the operation and maintenance floating body 3. A hole for connecting the supporting component is provided on the groove body 3-7.

When the supporting component is a supporting rod 1, the supporting rod 1 preferably connects to no less than two operation and maintenance floating bodies 3.

In a specific embodiment, the supporting component includes a longitudinal connecting rod 7 and a transverse connecting rod 8 connected to the longitudinal connecting rod 7, the longitudinal connecting rod 7 is connected to the groove bodies 3-7 of the adjacent operation and maintenance floating bodies 3 in the operation and maintenance passage, and the electrical device mounting position 1-1 is provided on the transverse connecting rod 8.

In a specific embodiment, the longitudinal connecting rod 7 is arranged above the operation and maintenance floating body 3, the operation and maintenance floating bodies 3 are connected to the longitudinal connecting rod 7, the operation and maintenance floating bodies 3 in the same row may not be connected, the transverse connecting rod 8 is arranged above the longitudinal connecting rod 7 and connected with the longitudinal connecting rod 7, so that a large floating square array is formed by longitudinal and transverse arrangement.

The multiple supporting bases 6 for mounting the photovoltaic modules are arranged on the transverse connecting rod 8, front and rear components are mounted on one supporting base 6. The front and rear heights of the supporting base 6 are different, so that the photovoltaic module forms an inclined angle. Each of the photovoltaic modules straddles the two transverse connecting rods 8, and such many photovoltaic modules, supporting bases 6, supporting components and operation and maintenance floating bodies 3 constitute a complete floating power station. The proportional relationship between the operation and maintenance floating body 3 and the photovoltaic module may be adjusted arbitrarily, and may not be the proportional relationship of 1:2 as shown in the figure. The operation and maintenance floating body 3 may be arranged in a gap between the photovoltaic modules or under the photovoltaic module.

During the specific assembly, in the floating power station, the space of the transverse connecting rods 8 may be adjusted arbitrarily according to the size of the photovoltaic module, which is not specifically limited in this application.

A floating power station provided according to the present application, includes the bearing device according to any one of the above and a photovoltaic module 2 mounted on an electrical device mounting position 1-1. The bearing device is any one of the above bearing devices. The specific structure of the bearing device is described in the foregoing. The present application includes the above bearing device, which also the above technical effects.

In a specific embodiment, preferably, between two adjacent operation and maintenance passages, at least two rows of the photovoltaic modules 2 are arranged in an arrangement direction of the operation and maintenance floating bodies 3 in the operation and maintenance passages.

As shown in FIGS. 1 and 6, upper surfaces of all the photovoltaic modules 2 in the same row are coplanar.

Figure 12:
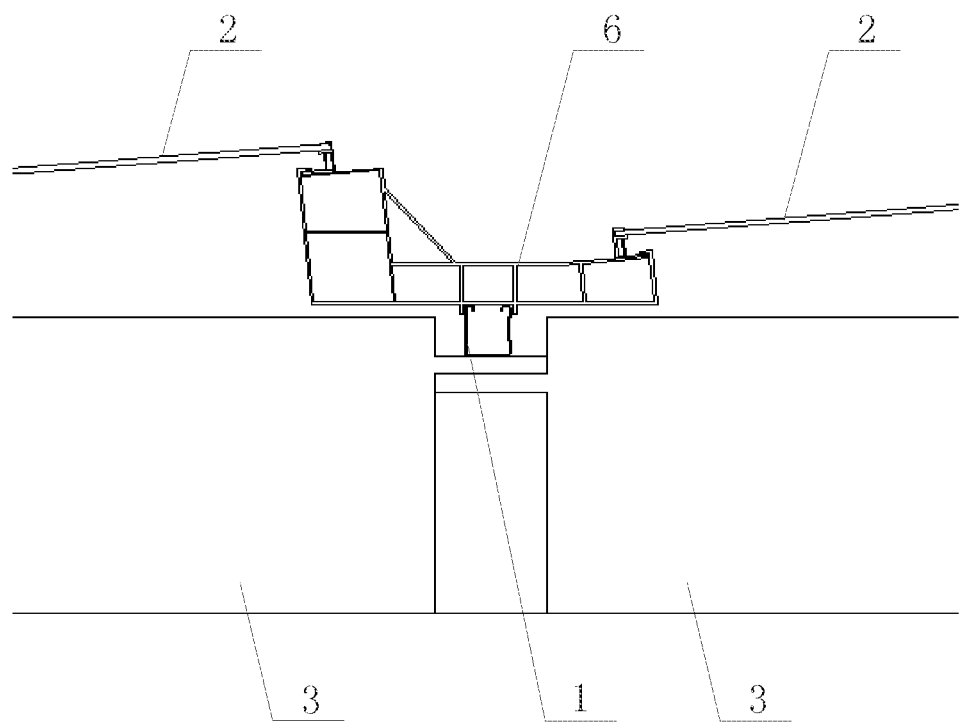
FIG. 12 is a partial enlarged view of the floating power station shown in FIG. 11.
Figure 16:
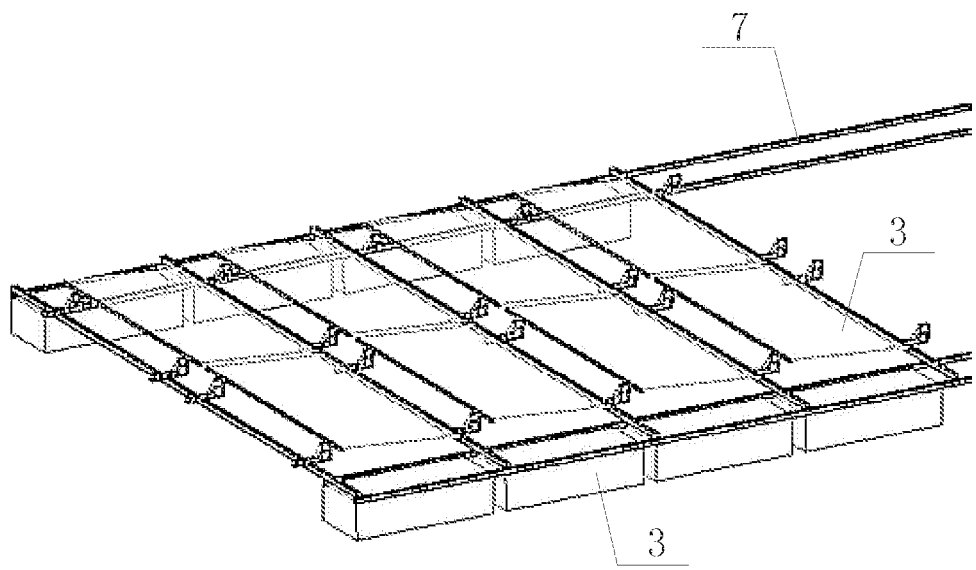
FIG. 16 is a three-dimensional structural diagram of the floating power station shown in FIG. 15.
Figure 17:
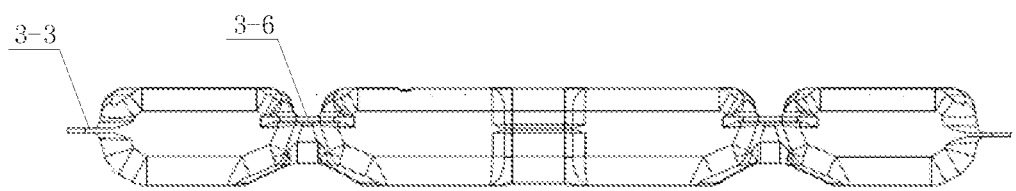
FIG. 17 is a schematic structural diagram of a third operation and maintenance floating body provided according to a third embodiment of the present application.

In another embodiment, as shown in FIGS. 12 and 16, upper surfaces of all the photovoltaic modules 2 in the same row are parallel, and the upper surfaces of the two adjacent photovoltaic modules 2 in the same row are arranged in parallel and equally spaced apart or not equally spaced apart.

The above embodiments are described in a progressive manner, Each of the embodiments is mainly focused on describing its differences from other embodiments, and reference may be made among these embodiments with respect to the same or similar parts.

The above illustration of the disclosed embodiments can enable those skilled in the art to implement or use the present application. Various modifications to the embodiments are apparent to the person skilled in the art, and the general principle herein can be implemented in other embodiments without departing from the spirit or scope of the present application. Therefore, the present application is not limited to the embodiments described herein, but should be in accordance with the broadest scope consistent with the principle and novel features disclosed herein.

The invention claimed is:

1. A bearing device for a floating power station, comprising a supporting component and at least two rows of operation and maintenance passages formed by a plurality of operation and maintenance floating bodies arranged in sequence, two adjacent rows of operation and maintenance passages are connected by the supporting component, and an electrical device mounting position for mounting an electrical device is provided on the supporting component,
    wherein each operation and maintenance floating body comprises a main floating body for forming a floating chamber and two ear connectors mounted on short edges, located at two sides, of the main floating body, the ear connectors are provided with floating body mounting positions for connecting the two adjacent operation and maintenance floating bodies in the same row,
    wherein the supporting component is a supporting rod,
    wherein the plurality of the operation and maintenance floating bodies in the same row comprise at least two first operation and maintenance floating bodies and at least one second operation and maintenance floating body, the second operation and maintenance floating body is connected between two adjacent first operation and maintenance floating bodies, and supporting rod mounting positions for mounting the supporting rod are provided on the ear connectors of the first operation and maintenance floating bodies,
    wherein each of the main floating bodies of the plurality of the operation and maintenance floating bodies in the same row comprise an upper side wall and a lower side wall, the lower side wall protrudes out of two sides of the upper side wall along an arrangement direction of the operation and maintenance floating bodies in the same row, an end of the upper side wall is connected to an end of the ear connector, the lower side wall is connected to a lower surface of the ear connector, and the supporting rod mounting positions are located directly above the lower side wall.

2. The bearing device for the floating power station according to claim 1, wherein two ends of the supporting rod are respectively connected to opposite sides of the operation and maintenance floating bodies in two rows of the operation and maintenance passages.

3. The bearing device for the floating power station according to claim 1, wherein a mounting groove for supporting and accommodating the supporting rod is provided on an upper surface of the main floating body, and two ends of the mounting groove extend to two ends of the main floating body in a longitudinal direction.

4. The bearing device for the floating power station according to claim 3, wherein at least two mounting grooves are provided, and all the mounting grooves are arranged in sequence in a transverse direction of the main floating bodies.

5. The bearing device for the floating power station according to claim 3, wherein an end of the mounting groove of the main floating body is provided with an ear holder, and the ear holder is provided with a mounting hole for connection with the supporting rod.

6. The bearing device for the floating power station according to claim 1, wherein a first leg and a second leg for supporting front and rear sides of the electrical device are provided on the supporting rod, and a height of the first leg is larger than a height of the second leg.

7. The bearing device for the floating power station according to claim 1, further comprising a V-shaped supporting frame for supporting the electrical device.

8. The bearing device for the floating power station according to claim 7, wherein the V-shaped supporting frame is mounted on the supporting rod.

9. The bearing device for the floating power station according to claim 3, further comprising a middle supporting rod is-provided between two adjacent rows of operation and maintenance floating bodies for mounting the electrical device, and the middle supporting rods is connected to two middle supporting rods.

10. The bearing device for the floating power station according to claim 1, wherein the ear connector comprises a first ear connector and a second ear connector respectively located on the short edges of the two sides of the main floating body, a height of a lower surface of the first ear connector is the same as a height of an upper surface of the second ear connector when the main floating body naturally floats on the water surface, a bottom of the second ear connector is provided with a supporting plate, the first ear connector of one of the two adjacent the operation and maintenance floating bodies is connected to the second ear connector of the other of the two adjacent the operation and maintenance floating bodies in a same row, and the supporting component is mounted on the first ear connector.

11. The bearing device for the floating power station according to claim 1, wherein the operation and maintenance floating body comprises a main floating body, and two long edges of a top end of the main floating body are each provided with a groove for supporting the supporting component.

12. The bearing device for the floating power station according to claim 11, wherein the supporting component comprises a longitudinal connecting rod and a transverse connecting rod connected to the longitudinal connecting rod, the longitudinal connecting rod is connected to the grooves of two adjacent operation and maintenance floating bodies in the operation and maintenance passage, and the electrical device mounting position is provided on the transverse connecting rod.

13. The bearing device for the floating power station according to claim 1, further comprising a supporting base arranged on the supporting component for supporting two adjacent photovoltaic modules, wherein the supporting base is provided with a first supporting member for supporting a bottom end of one photovoltaic module and a second supporting member for supporting a top end of the other photovoltaic module, and a height of the top end of the second supporting member is larger than a height of a top end of the first supporting member.

14. The bearing device for the floating power station according to claim 1, wherein a filling medium of the internal chamber of is a gas with a density smaller than water and/or a solid with a density smaller than water.

15. A floating power station, comprising the bearing device according to claim 1 and a photovoltaic module mounted on the electrical device mounting position.

16. The floating power station according to claim 15, wherein between two adjacent operation and maintenance passages, at least two rows of the photovoltaic modules are arranged in an arrangement direction of the operation and maintenance floating bodies in the operation and maintenance passages.

17. The floating power station according to claim 16, wherein upper surfaces of all the photovoltaic modules in the same row are coplanar; or upper surfaces of all the photovoltaic modules in the same row are parallel, and the upper surfaces of the two adjacent photovoltaic modules in the same row are arranged in parallel and equally spaced apart.

* * * * *